June 2, 1964  J. D. FRY ETAL  3,135,339
TOOL BAR FOR FARM IMPLEMENTS
Filed Jan. 6, 1961  3 Sheets-Sheet 1

INVENTORS
Joseph Dale Fry
Eugene F. Ware
BY
Wells & St. John
ATTYS.

June 2, 1964  J. D. FRY ETAL  3,135,339
TOOL BAR FOR FARM IMPLEMENTS
Filed Jan. 6, 1961  3 Sheets-Sheet 2

INVENTORS
Joseph Dale Fry
Eugene F. Ware
BY
ATTYS

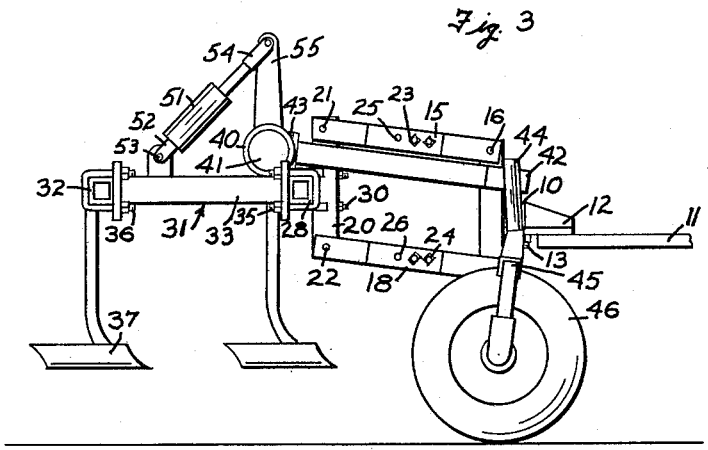
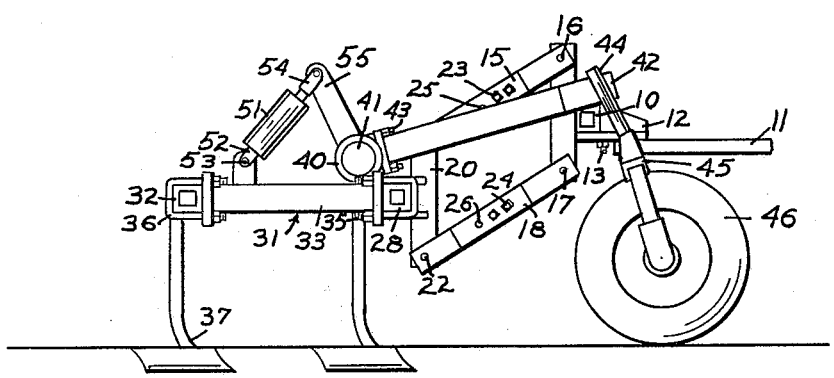
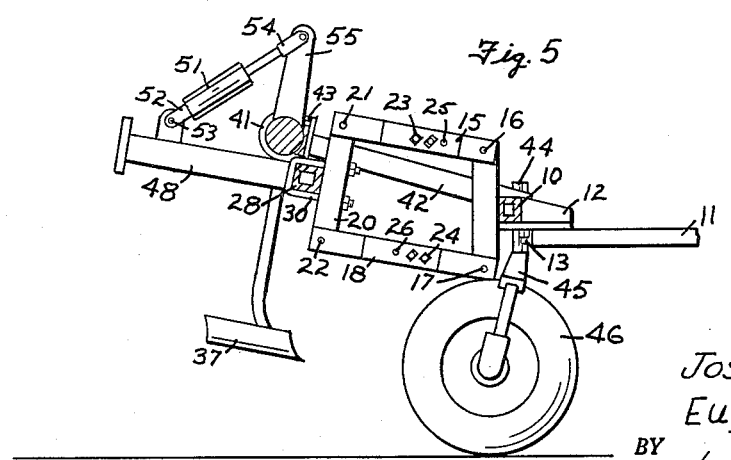

3,135,339
TOOL BAR FOR FARM IMPLEMENTS
Joseph Dale Fry, P.O. Box 382, and Eugene F. Ware,
905 Center St., both of Garden City, Kans.
Filed Jan. 6, 1961, Ser. No. 81,090
2 Claims. (Cl. 172—413)

This invention relates to a tool bar for farm implements comprising a structure which can be fixed directly to a tractor drawbar.

It is an object of this invention to provide a tool bar which can be attached to the drawbar of any tractor without utilizing a three point hitch. Under the present structure, the operator is afforded positive control of the tool bar at all times, since it is rigidly joined to the tractor frame by means of the common drawbar.

It is a second object of this invention to provide positive hydraulic depth control of the implements by providing a constant reference structure fixed to the tractor drawbar.

Another object is to provide a tool bar wherein all tools and attachments are clamped to the tool bar to thereby provide a means for readily re-spacing the tools without special equipment.

It is an object of the invention to provide a tool bar usable for a single row of tools or for a plural number of rows.

Another object is to provide a flexible linkage between the tractor and the ground working tools to thereby allow the structure to yield when working uneven ground. The flexible linkage is further utilized to adjust the angular pitch of the ground tools for varying conditions.

These and further objects will be evident from a study of the following description and the accompanying drawings which illustrate a preferred form of the invention. This form as shown is merely illustrative of the practical embodiments envisioned through this invention. Only the claims which follow are intended to limit the invention.

In the drawings:

FIGURE 3 is a left end view of the apparatus shown in FIGURE 2 with the implements retracted for transport;

FIGURE 4 is a view similar to FIGURE 3 with the implements in operating position; and FIGURE 5 is a view taken along line 5—5 in FIGURE 2 showing the single tool bar with the implements retracted and adjusted at an angle to the vertical.

Figure 1:
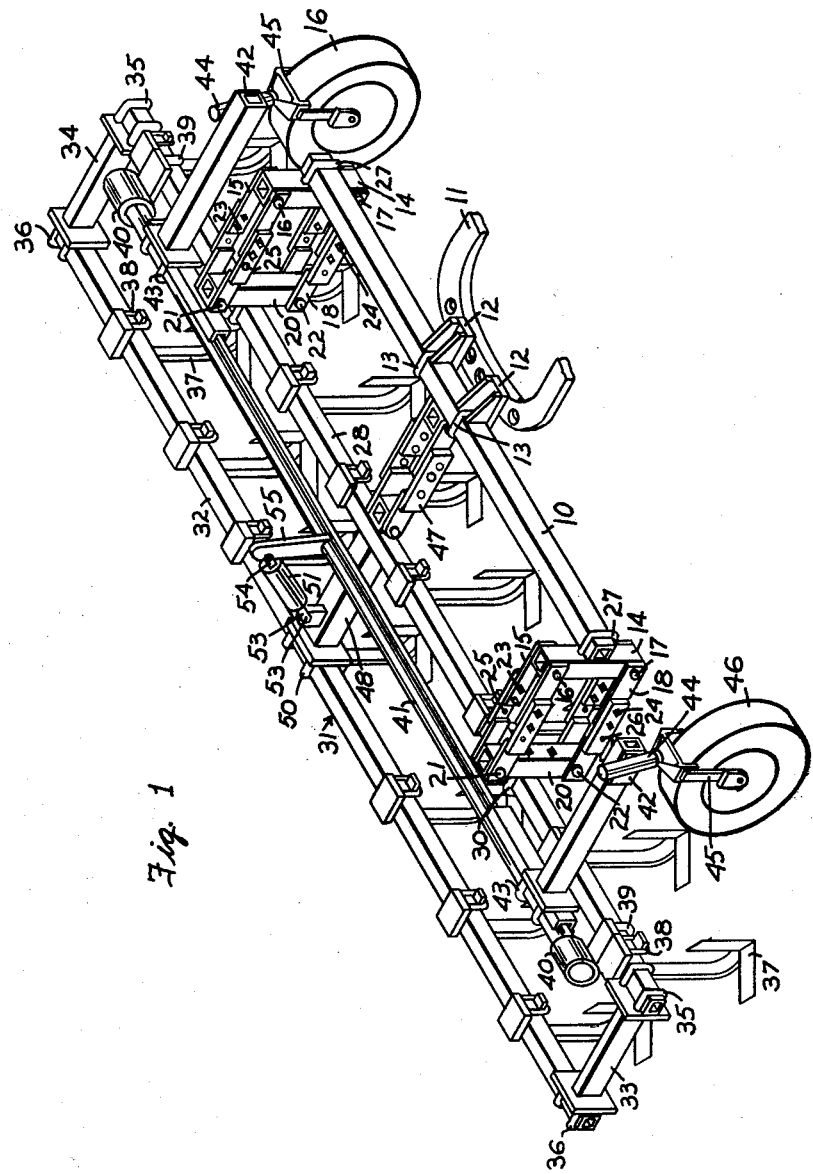
FIGURE 1 is a perspective view of the tool bar as mounted on a tractor drawbar, the forward portion of the drawbar being broken away.
Figure 2:
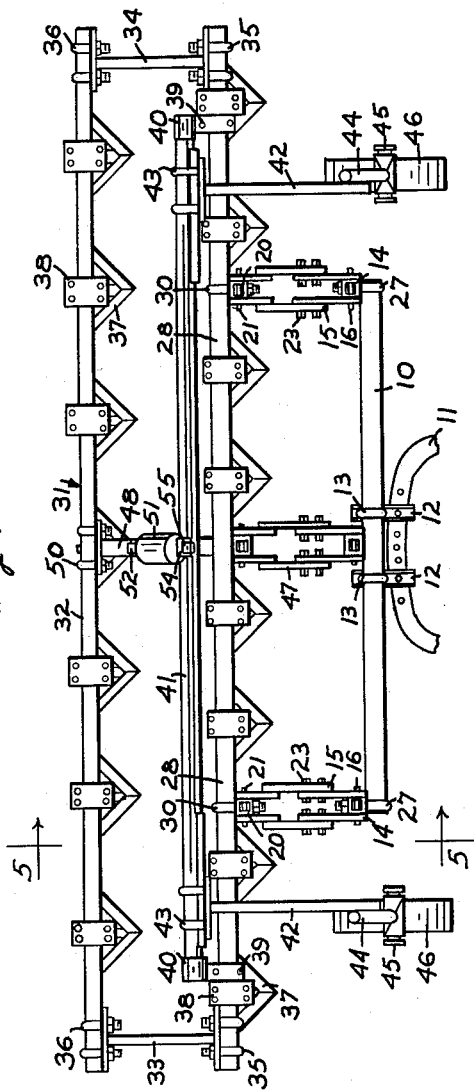
FIGURE 2 is a top plan view of the assembly shown in FIGURE 1.

Referring now to the drawings, there is shown a direct connected tool bar which incorporates the same advantages previously obtained only by use of a complicated three point hitch. Such hitches are normally utilized to provide depth control and elevational control for highway travel. According to the simple arrangement of this present tool bar, a first transverse horizontal member 10 of square tubular metal stock, is adapted to be fastened rigidly to a rear tractor drawbar 11 of common design by means of two mounting brackets 12 secured to the member 10 by U-bolts 13.

Since the present tool bar is symmetrical about its central division, the various parts will be labelled identically on each side of the tool bar. At each transverse end of the first member 10 is mounted a vertical parallelogram linkage including a first vertical element 14 of square tubular metal stock. An adjustable top link 15 is pivoted to the top end of element 14 by a pin 16. A similar pin 17 pivotally joins an adjustable bottom link 18 to the lower end of element 14. A second element 20 completes the parallelogram and is pivotally joined at its top and bottom ends to the links 15, 18 by means of pins 21 and 22 respectively. The two links 15, 18 can be longitudinally adjusted by means of bolts 23, 24 respectively and a plurality of bolt receiving apertures 25, 26 respectively.

The element 14 is secured at its vertical midpoint to member 10 by means of U-bolt 27. Element 20 is similarly secured at its vertical midpoint to a bar 28 by means of a second U-bolt 30. The bar 28 is the first tool carrying element of a second transverse horizontal member generally designated as 31. In the present example, member 31 consists of two horizontal tool-carrying bars 28 and 32. The two bars are rigidly secured in a rectangular configuration by two end longitudinal braces 33, 34 joined to bars 28 and 32 by means of bolts 35—36 respectively. The farm implements 37 of common design, are fastened to bars 28, 32 by means of U-bolts 38.

A pair of transverse bearings 40 are secured to the upper surface of bar 28 by means of U-bolts 39. Rotatably journalled between these two bearings 40 is a pivot shaft 41. A mounting arm 42 is fastened to each end of shaft 41 by means of U-bolts 43. The outboard end of each mounting arm 42 has fixed thereto a forwardly and downwardly extending rod 44 which rotatably carries a yoke 45 which in turn journals a ground engaging guage wheel 46.

In order to add stability to the structure and aid in the transmission of pulling power from drawbar 11 to bar 28, an adjustable link 47 is pivoted at each of its ends to the first member 10 and bar 28 respectively at the center of the unit and directly behind drawbar 11. Also, a rearwardly extending brace 48 is fixed to the bar 28 at its center. Brace 48 can be secured to a second bar 32 by means of a U-bolt 50. The principal function of brace 48 is to act as a foundation for a hydraulic jack 51, whose base 52 is pivoted to brace 48 about a transverse axis by a pin 53. The far end of the jack actuating element 54 is pivoted to a lever 55 fixed to the central portion of pivot shaft 41. Jack 51 is adapted to be expanded or contracted by the usual hydraulic controls at the will of the operator.

The above described apparatus is entirely adjustable. By varying the lengths of links 15 and 18, the angle of the implements 37 will be altered with respect to the tractor drawbar 11. The guage wheels 46 can be raised or lowered with respect to bars 28, 32 by use of jack 51. Due to the parallelogram linkage assemblies, the angle of implements 37 will remain constant at each elevation. Either one or two bars 28, 32 may be used. The wheels 46 are mounted forward of the implements 37 so as to run on solid ground and cannot pack the worked soil. The ability of wheels 46 to pivot about the axes of rods 44 provides a useful guide for backing or turns of short radius. The two independent parallelograms allow one end to move vertically independently of the other when moved over uneven terrain.

The jack 51 provides positive control of the ground elevation of bars 28, 32. The tool bar is constantly under the operator's control, since it is directly connected to the tractor. There can be no jack-knifing between the tractor and tool bar. The overall apparatus is readily retained or adjusted through the use of the U-bolts which fasten the many parts together. In all, a very simple and effective implement tool bar is provided, which is capable of attachment to all tractors.

Many minor changes will present themselves to those in this field without leaving the intended scope of this invention. For this reason, the foregoing is not intended

Having thus described my invention, I claim:

1. A tool bar for agricultural earth working implements, comprising:
    a first horizontal member positioned perpendicularly to the intended direction of travel of the implements relative to the ground, said first member being adapted to be rigidly connected to a drawbar;
    a pair of vertical parallelogram assemblies each comprising:
    a first vertical element securely fixed to said first member;
    a second vertical element spaced rearwardly from said first vertical element;
    and third and fourth longitudinally adjustable elements pivotally joined to the top ends of said first and second elements and to the bottom ends of said first and second elements respectively;
    a second horizontal member adapted to carry ground engaging implements, said second member being rigidly secured to the second elements of said parallelogram assemblies in a position parallel to that of said first member;
    ground engaging wheel means;
    mounting means rotatably carrying said wheel means, said mounting means being pivotally mounted on said second member for rotation about an axis parallel to said first member;
    and means connected between said second member and said mounting means adapted to angularly position said mounting means about said last named axis.

2. A tool bar for agricultural earth working implements, comprising:
    a first member positioned transversely to the intended direction of travel of the implements relative to the ground;
    means fixed to said first member at its center adapted to fixedly secure said first member to a tractor drawbar;
    a pair of vertical parallelogram assemblies spaced along the first member, each parallelogram assembly comprising first and second vertical elements, plus parallel adjustable pivot links joining said first and second vertical elements, the first vertical element of each parallelogram assembly being secured to said first member;
    a second member positioned parallel to said first member adapted to carry earth working implements, said second member being secured to the second vertical element of each parallelogram assembly.
    a pair of transversely spaced gauge wheels;
    offset mounting means rotatably carrying said gauge wheels including a single transverse element rotatably journalled on said second member, said gauge wheels being located forward of said second member;
    and hydraulic cylinder means pivotally connected between said second member and said offset mounting means adapted to angularly position said mounting means about its pivotal axis on said second member.

References Cited in the file of this patent

UNITED STATES PATENTS

| | | |
|---|---|---|
| 2,518,363 | Orelind | Aug. 8, 1950 |
| 2,899,776 | Arnold | Aug. 18, 1959 |

FOREIGN PATENTS

| | | |
|---|---|---|
| 539,003 | Great Britain | Aug. 25, 1941 |